No. 655,769. Patented Aug. 14, 1900.
G. A. FORD.
STORAGE BATTERY.
(Application filed Sept. 5, 1895.)
(No Model.)

ATTEST.
P. B. Moser
A. Robertson.

INVENTOR.
George A. Ford.
By H. J. Fisher
ATTY

THE NORRIS PETERS CO., PHOTO-LITHO., WASHINGTON, D. C.

UNITED STATES PATENT OFFICE.

GEORGE A. FORD, OF CLEVELAND, OHIO.

STORAGE BATTERY.

SPECIFICATION forming part of Letters Patent No. 655,769, dated August 14, 1900.

Application filed September 5, 1895. Serial No. 561,485. (No model.)

*To all whom it may concern:*

Be it known that I, GEORGE A. FORD, a citizen of the United States, residing at Cleveland, in the county of Cuyahoga and State of Ohio, have invented certain new and useful Improvements in Storage Batteries; and I do hereby declare that the following is a full, clear, and exact description of the invention, which will enable others skilled in the art to which it appertains to make and use the same.

My invention has reference to storage batteries; and the invention consists in the construction and combination of certain parts of the battery, all as hereinafter fully described, and particularly pointed out in the claims.

Figure 1:
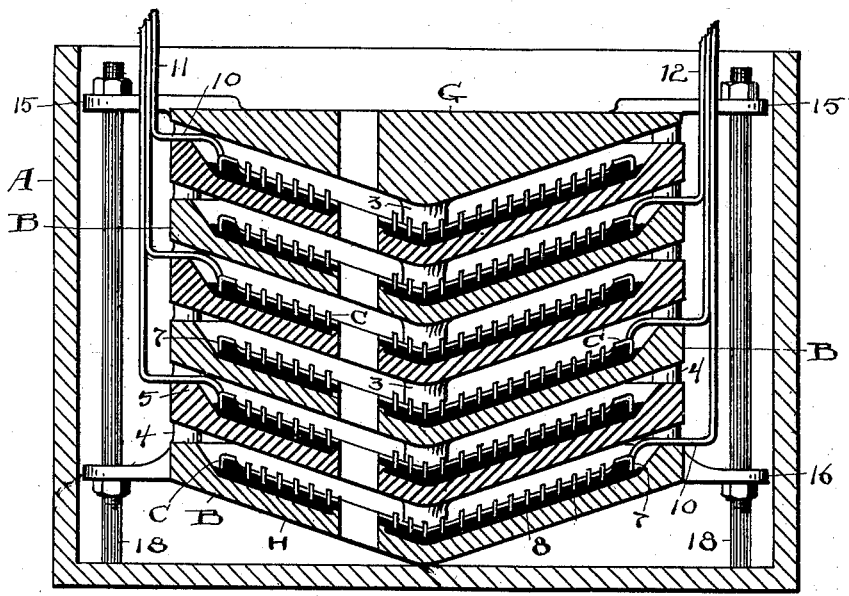
Figure 4:
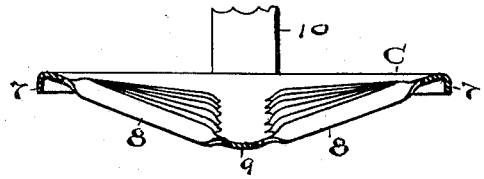
Figure 2:
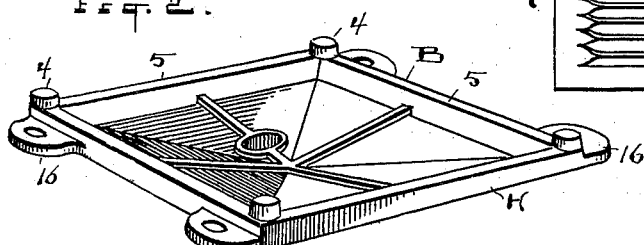
Figure 3:
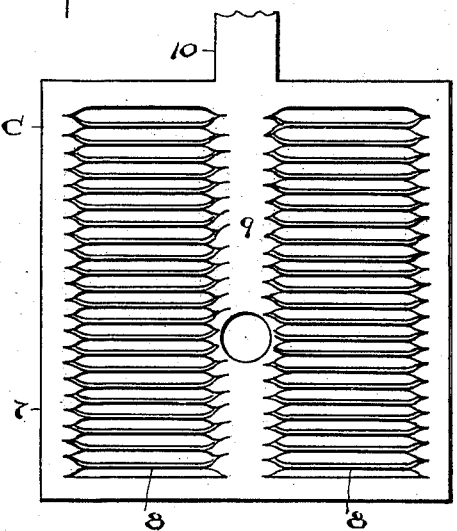

In the accompanying drawings, Figure 1 is a vertical sectional elevation of one of my improved battery-cells. Fig. 2 is a perspective view of one of the porous non-conducting pans or receptacles. Fig. 3 is a plan view of one of the conductors adapted to fit said pans, and Fig. 4 is a cross-section thereof.

Having reference first to the physical parts of the battery, A is any suitable containing-jar, of any of the various materials used for this purpose, and may be of any preferred size and style.

B represents the earthen porous non-conducting pans or receptacles, which in this case are rectangular in form; but they may be circular or of any desired form and have a bottom which is deepest at its middle or center. In this case said pans have four inclined bottom sides converging toward a common center, and preferably on the bottom and outside of each pan at its center is a projection 3, adapted to rest on the conductor next beneath and support the pan at this point, as well as hold the conductor down. A projection at the top and center of the pan would serve the same purpose. Then there are posts or projections 4 at the four corners on top corresponding in length to the projection 3 and serving as corner-supports for the pans, or these might be along the top edge and apart from the corners, if preferred. There is also shown here a rim 5 at the top of the pan, which obviously will give strength to the pan when used.

C represents the current-conductors. These conductors are of lead or any other suitable material and conform to the shape of the pan B within rim 5 and have about their outer edge a downwardly-projecting flange 7 of about the same depth as the rim 5 on the pan B. It will be observed also that the conductor C is formed with panels or vanes 8, shown in this instance in series or sets at each side of the center portion 9 and running thence to near the edge of the conductor. These panels are formed by slitting the conductor at intervals and then turning up the material between the slits or cuts to inclined position or to a right angle, substantially as shown. They might extend from side to side of the conductor, if preferred, and a differently-constructed conductor might be used, if preferred.

Owing to the swelling and crowding of the active material when it is forming I have found that expanding room over the entire surface of the conductor is desirable, and hence the present construction with vanes 8, which allows the active material to swell up between the said vanes, and thus afford all the relief that may be needed and without removing the said material out of contact with the conductor or in any way impairing the action of the battery.

Each conductor has a connector 10, by which it is united with the common conductor 11 or 12, according as it is positive or negative. Any well-known way of connecting up the battery may be employed.

The successive elements are built up one after another until the pile is completed, and they are ready to be placed in the cell and coupled up for use.

It will be noticed as a further feature of construction of the cell that the top and bottom porous members G and H, respectively, have each laterally-extending ears 15 and 16 at their four corners, through which pass rods 18, of hard rubber or other non-conducting material, serving to tie the cell together. The rods 18 are shown as extending down to the bottom of the cell, so as to afford corner-supports therefor; but other supports might be provided for the edges of the pans to sustain them at this point. The bottom pan has no projection on its center and outside like the intervening pan, and instead of making the top member of the pile like the pans B I have shown it here as having a flat top, thus affording surface to imprint or mold the manufacturer's name and the date of the patent.

What I claim is—

1. A storage-battery element consisting of a series of porous pans and a series of conductors on said pans, each of said conductors having a series of vanes at an angle to the plane of the pan, and active material between said vanes, substantially as described.

2. The battery element described, comprising a porous earthen pan, in combination with a conducting-plate of suitable metal provided with a series of flat-sided vanes cut from the plate itself and standing substantially edgewise to the said plate, substantially as described.

3. The cell described having a series of porous earthen pans with raised borders about their edge and wholly closed over their bottom between said borders except a single open passage, in combination with a conductor having a series of flat-sided vanes turned edgewise and resting on said pans, and active material upon the surface of said pans and between said vanes, substantially as described.

4. The cell described consisting of a series of bordered porous pans lowest at their center and having the bottom from said center inclined upward toward the border of the pan, in combination with a conductor constructed to rest over the entire bottom of each of said pans and having a series of flat vanes turned edgewise and a border about said vanes, and active material covering the bottom of said pan and between said vanes, substantially as described.

5. In a storage battery, the combination of a supporting-pan of non-conducting material with a conductor in said pan having a series of flat vanes extending through from side to side thereof, at an angle to the plane of the pan, substantially as described.

6. In a storage battery, a substantially dish-shaped earthen pan, in combination with a conductor shaped to conform to the pan and having a central rib and a series of panels in sets at either side of said rib and having an open space for the active material opening from side to side of the conductor to the top surface of the pan, substantially as described.

Witness my hand to the foregoing specification this 28th day of August, 1895.

GEORGE A. FORD.

Witnesses:
H. T. FISHER,
R. B. MOSER.